US012602958B2

(12) United States Patent
Pai Raikar et al.

(10) Patent No.: US 12,602,958 B2
(45) Date of Patent: Apr. 14, 2026

(54) USING LIGHTING ZONES TO COMMUNICATE PRE-TRIP DIAGNOSTICS

(71) Applicant: Torc Robotics, Inc., Blacksburg, VA (US)

(72) Inventors: Akshay Pai Raikar, Austin, TX (US); Christopher Harrison, Austin, TX (US); Joseph R. Fox-Rabinovitz, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 31 days.

(21) Appl. No.: 18/739,045

(22) Filed: Jun. 10, 2024

(65) Prior Publication Data

US 2025/0378723 A1 Dec. 11, 2025

(51) Int. Cl.
*G07C 5/08* (2006.01)
*B60Q 1/50* (2006.01)
*B60Q 5/00* (2006.01)

(52) U.S. Cl.
CPC ........... *G07C 5/0833* (2013.01); *B60Q 1/507* (2022.05); *B60Q 5/005* (2013.01); *G07C 5/0808* (2013.01); *G07C 5/0825* (2013.01)

(58) Field of Classification Search
CPC .. G07C 5/0833; G07C 5/0808; G07C 5/0825; B60Q 1/507; B60Q 5/005
See application file for complete search history.

(56) References Cited

U.S. PATENT DOCUMENTS

| | | |
|---|---|---|
| 7,496,439 B2 | 2/2009 | McCormick |
| 8,285,439 B2 | 10/2012 | Hodges |
| 8,842,176 B2 | 9/2014 | Schofield et al. |
| 8,918,245 B2 | 12/2014 | Dewhurst et al. |
| 9,849,828 B2 | 12/2017 | Foster et al. |
| 9,931,974 B2 | 4/2018 | Seitz et al. |
| 10,053,001 B1 | 8/2018 | Nabbe et al. |
| 10,421,396 B2 | 9/2019 | Hanson et al. |
| 10,766,423 B2 | 9/2020 | Herrmann et al. |
| 10,870,430 B2 | 12/2020 | Relihan et al. |
| 10,926,737 B2 | 2/2021 | Tanaka |
| 11,188,191 B2 | 11/2021 | Marshall et al. |
| 11,195,353 B2 | 12/2021 | Nix et al. |
| 11,840,145 B2 | 12/2023 | Glaser et al. |
| 11,858,413 B2 | 1/2024 | Mazuir et al. |
| 12,275,347 B1 * | 4/2025 | Stieber .................. B60Q 1/507 |
| 2019/0111838 A1 | 4/2019 | Hanson et al. |
| 2022/0050475 A1 | 2/2022 | Mcenroe et al. |
| 2022/0402525 A1 | 12/2022 | Maeda |
| 2022/0408265 A1 | 12/2022 | Maeda |
| 2023/0191987 A1 | 6/2023 | Morimura et al. |
| 2024/0042927 A1 | 2/2024 | Nojiri et al. |
| 2025/0065804 A1 * | 2/2025 | Bandi .................. B60Q 1/543 |

\* cited by examiner

*Primary Examiner* — Michael V Kerrigan
(74) *Attorney, Agent, or Firm* — Armstrong Teasdale LLP

(57) ABSTRACT

An autonomy computing system and method of an autonomous vehicle for indicating vehicle status includes an electronic control unit for operating an indicator on an autonomous vehicle, the electronic control unit comprising a memory storing computer executable instructions and a processor coupled to the memory, the processor, upon execution of the computer executable instructions, configured to: receive data representing a status of the autonomous vehicle, determine an indication sequence associated with the status, and operate at least one indicator on the autonomous vehicle according to the indication sequence.

20 Claims, 5 Drawing Sheets

300

```
DETERMINING THE STATUS OF AN AUTONOMOUS VEHICLE        — 302

TRANSMITTING THE STATUS TO AN ELECTRONIC CONTROL UNIT  — 304

DETERMINING AN INDICATION SEQUENCE BASED ON THE STATUS OF THE
AUTONOMOUS VEHICLE                                     — 306

ACTIVATING AT LEAST ONE INDICATOR ON THE AUTONOMOUS VEHICLE — 308
```

USING LIGHTING ZONES TO COMMUNICATE PRE-TRIP DIAGNOSTICS

TECHNICAL FIELD

The field of the disclosure relates generally to pre-trip vehicle diagnostics and, more specifically, using lights or other markers to indicate vehicle status.

BACKGROUND OF THE INVENTION

It is important for autonomous or semi-autonomous vehicles to be well-maintained and properly investigated with a "pre-trip" check before the vehicle is deployed onto the roadways. The lack of a driver results in the series of pre-trip checks that must be undertaken being significantly increased in scope and rigor to ensure safety. The resulting diagnostics are correspondingly complex. Additionally, as there may be no pilot or driver of these vehicles, it is desirable for the vehicle itself to have a way to communicate the vehicle's status, errors, or other messages to mechanics, drivers, or law enforcement personnel. As autonomous and semi-autonomous vehicles become more prevalent, it is desirable to have a system that distills complex diagnostic states to a first order error report that is immediately visible to a bystander.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed method may be a method for determining the status of an autonomous vehicle, transmitting the status to an electronic control unit (ECU), determining an indication sequence based on the status, and activating at least one indicator on the autonomous vehicle according to the indication sequence.

In another aspect, a system for operating indicators on an autonomous vehicle is provided. The system may include an autonomy computing system configured to determine a status of an autonomous vehicle and transmit status data onto a bus, an electronic control unit coupled with the autonomy system and configured to receive the status data, determine an indication sequence based on the status data, and operate at least one indicator based on the indication sequence.

In yet another aspect, an electronic control unit for operating an indicator on an autonomous vehicle is provided. The electronic control unit may include a memory storing computer executable instructions and a processor coupled to the memory. The processor, upon execution of the computer executable instructions, is configured to: receive data representing the status of the autonomous vehicle, determine an indication sequence associated with the status, and operate at least one indicator on the autonomous vehicle according to the indication sequence.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
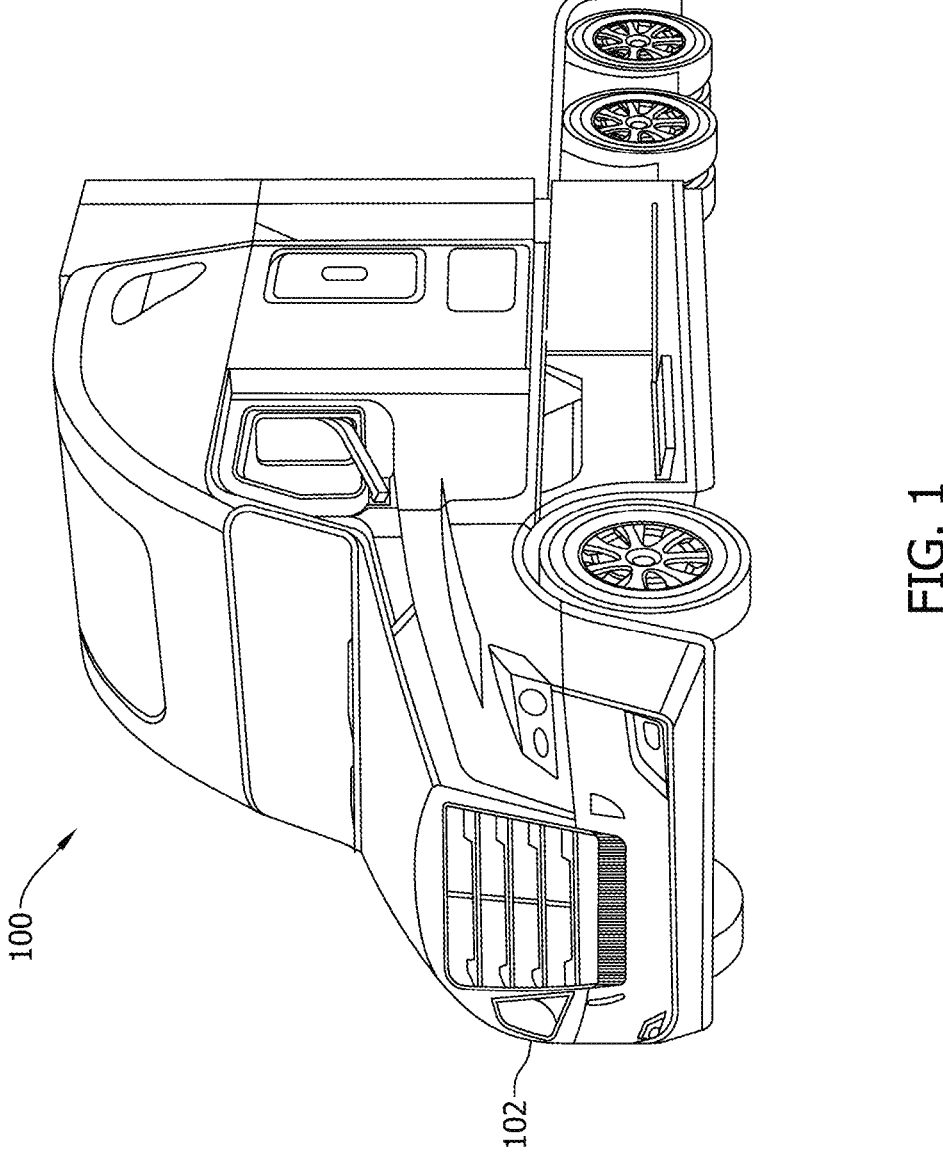
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

Before operation, an autonomous vehicle or self-driving truck typically passes through a series of pre-trip checks. Often these tests are administered by a ground staff member on-site with the vehicle. However, it may be difficult for a ground staff member to be made immediately aware of the status, potentially requiring additional communication with a mission control or headquarters to properly diagnose the vehicle. For example, it is desirable to have various permutations of lights or alarms that activate during various steps of a pre-trip test to allow a staff member to be made immediately aware of any failures, successes, or abnormalities.

In other circumstances, it is desirable to have a means by which an autonomous vehicle may communicate its own status to other drivers or law enforcement. For example, when stopped by law enforcement, an autonomous vehicle can indicate to a law enforcement officer that there is no driver present to expedite the traffic stop process and reduce any confusion on the part of the law enforcement official. It is desirable to have a vehicle able to indicate whether or not the vehicle is safe to approach, whether an intrusion in the vehicle is detected, if there are medical supplies on board, or if the vehicle is experiencing a navigation issue.

Figure 2:
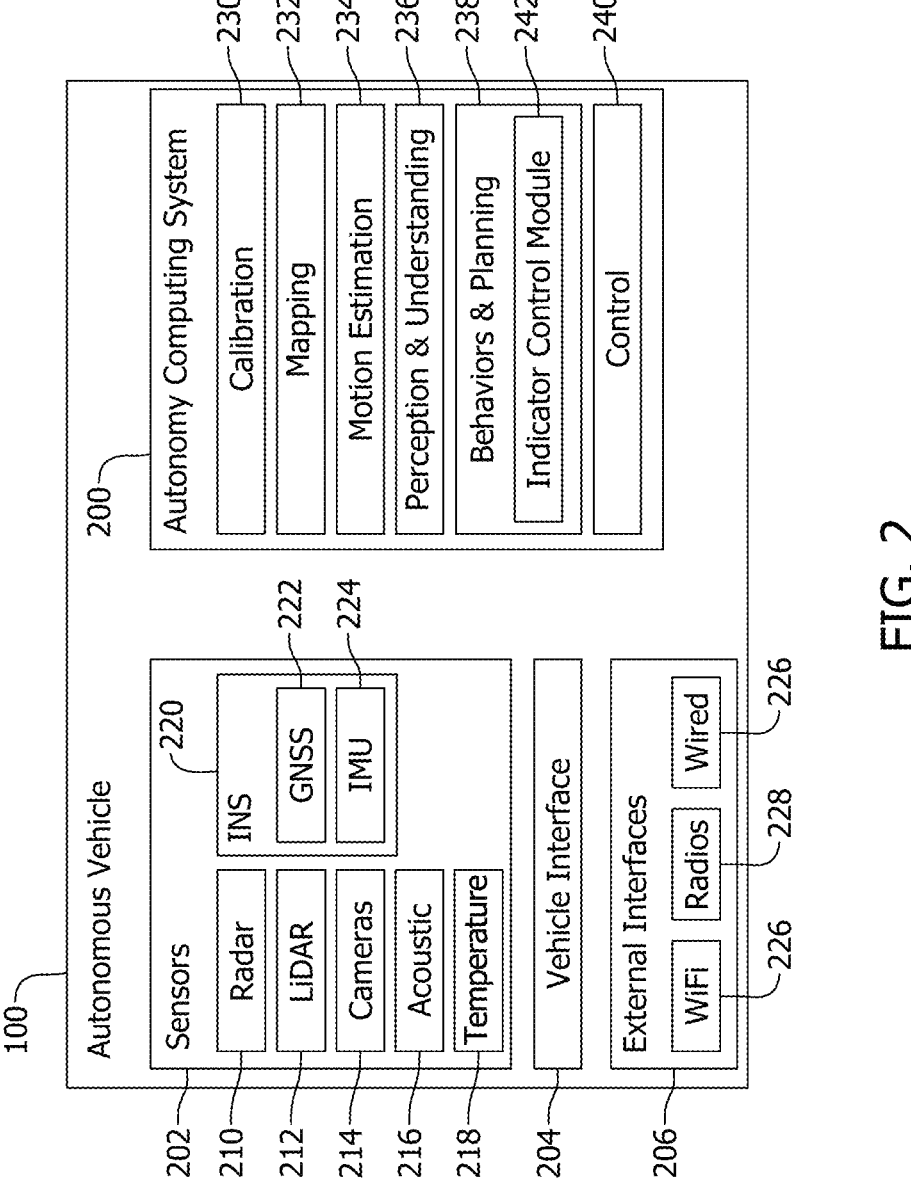
FIG. 2 is a block diagram of an autonomous vehicle.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operation of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and an indicator control module 242. Indicator control module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Indicator control module 242 manages status indicators on the autonomous vehicle 100. Indicator control module 242 receives, for example, a status message from another component of autonomy computing system 200, vehicle interface 204 or some other source associated with autonomous vehicle 100. Indicator control module 242 sends an indication sequence to one or more indicators 102 associated with the vehicle. In some embodiments, indicator control module 242 may be embodied, for example, in an electronic control unit, which is described below.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
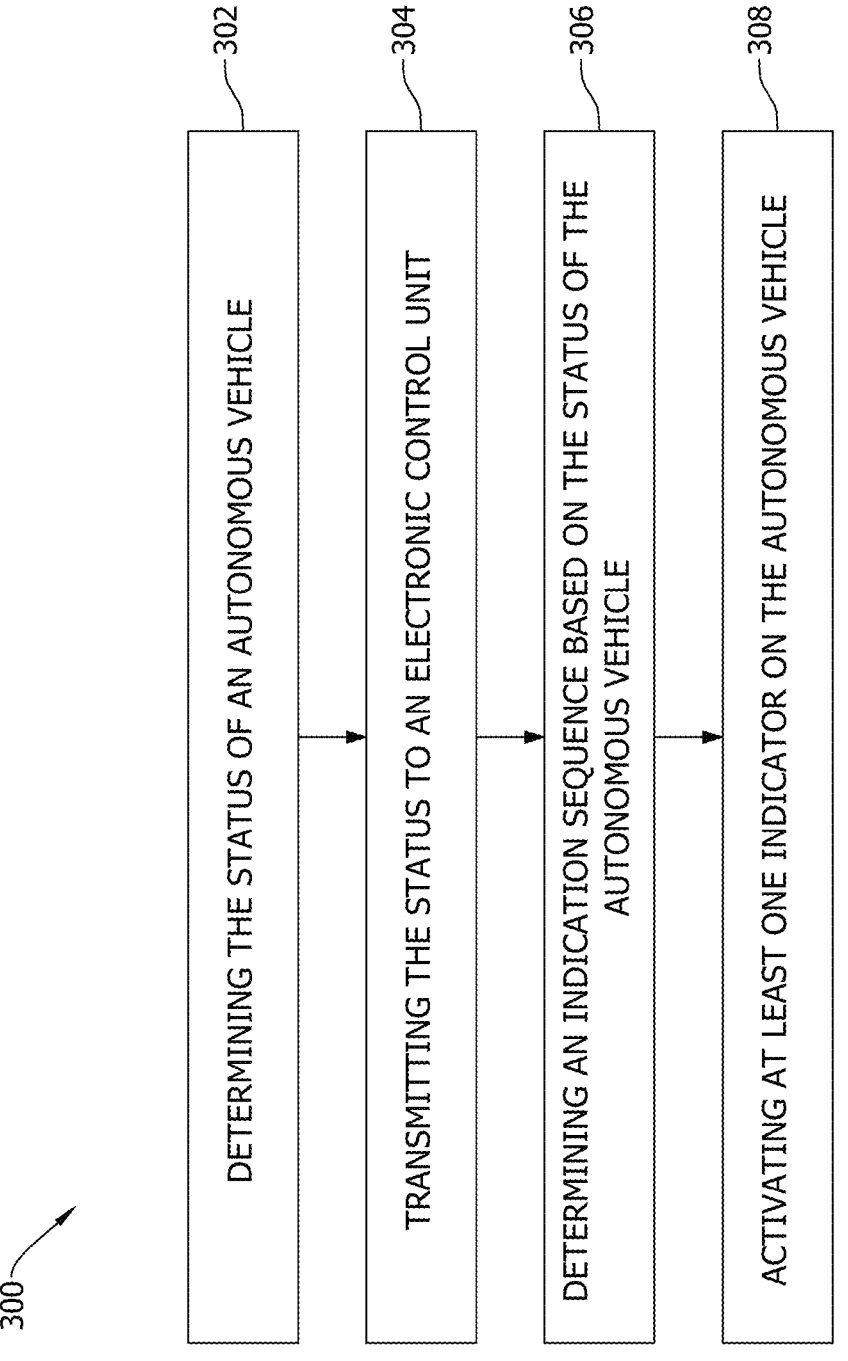
FIG. 3 is a flow chart of a method of indicating a status of an autonomous vehicle.

FIG. 3 is a flowchart of an embodiment of a method 300 of indicating a status of an autonomous vehicle 100. Referring to FIG. 2 autonomy computing system 200 or a similar component responsible for managing, driving, or otherwise controlling an autonomous vehicle first determines 302 a status associated with autonomous vehicle 100. Autonomy computing system 200 then transmits 304 status to an electronic control unit, for example via a system bus. Electronic control unit then determines 306 an indication sequence based on the status of the autonomous vehicle 100. Electronic control unit activates 308 at least one indicator 102 associated with the autonomous vehicle 100 according to the indication sequence.

In some embodiments, activating 308 of the at least one indicator 102 includes activating one or more visual indicators associated with the autonomous vehicle 100. Visual indicators include indicators intrinsic to the autonomous vehicle 100, for example, headlights, marker lights, taillights, brake lights, license plate lights, internal cabin lights, dashboard lights, or other lights or visual indication sources available to autonomous vehicle 100. In some embodiments, visual indicators also include one or more lights or indicators added to autonomous vehicle 100 after manufacture, such as an LED or RBG light strip retrofitted to autonomous vehicle 100.

In other embodiments, activating 308 at least one indicator 102 includes activating one or more audio devices associated with autonomous vehicle 100. Audio device may include one or more indicators intrinsic to the autonomous vehicle 100, for example, a horn or a digital sound effect from a cabin speaker. In other embodiments, audio device may include one or more indicators retrofitted to the vehicle, for example, a directional speaker or security alarm.

In some embodiments, transmitting 304 of status is initiated in response to detecting at least one abnormality associated with the autonomous vehicle 100. In some embodiments, the abnormality includes one or more runtime errors associated with the vehicle, for example, a failure of a system, such as a lane-finding system or perception system. In some embodiments, the abnormality includes a detected hazard or security issue, such as an intrusion within the cabin or cargo hold of autonomous vehicle 100. In some embodiments, the abnormality includes a detection that a third party has requested something of autonomous vehicle 100. For example, a law enforcement officer may signal the autonomous vehicle 100 to pull over, or a passerby may transmit a request to the autonomous vehicle 100 for assistance or medical supplies.

In some embodiments, transmitting 304 status is initiated in response to the autonomy computing system 200 determining a result of a vehicle diagnostic test. The result of the vehicle diagnostic includes one or more messages or indications that a system is working either properly or improperly. The result is transmitted 304 as a status message to the electronic control unit for further processing to determine an indication sequence.

In some embodiments, transmitting 304 status includes transmitting status to the electronic control unit over a system bus. In certain embodiments, system bus may be a Controller Area Network (CAN bus). The CAN bus is configured to transport status data or other data, messages, or instructions among components of the autonomous vehicle 100 or among components of the autonomy computing system 200.

Figure 4:
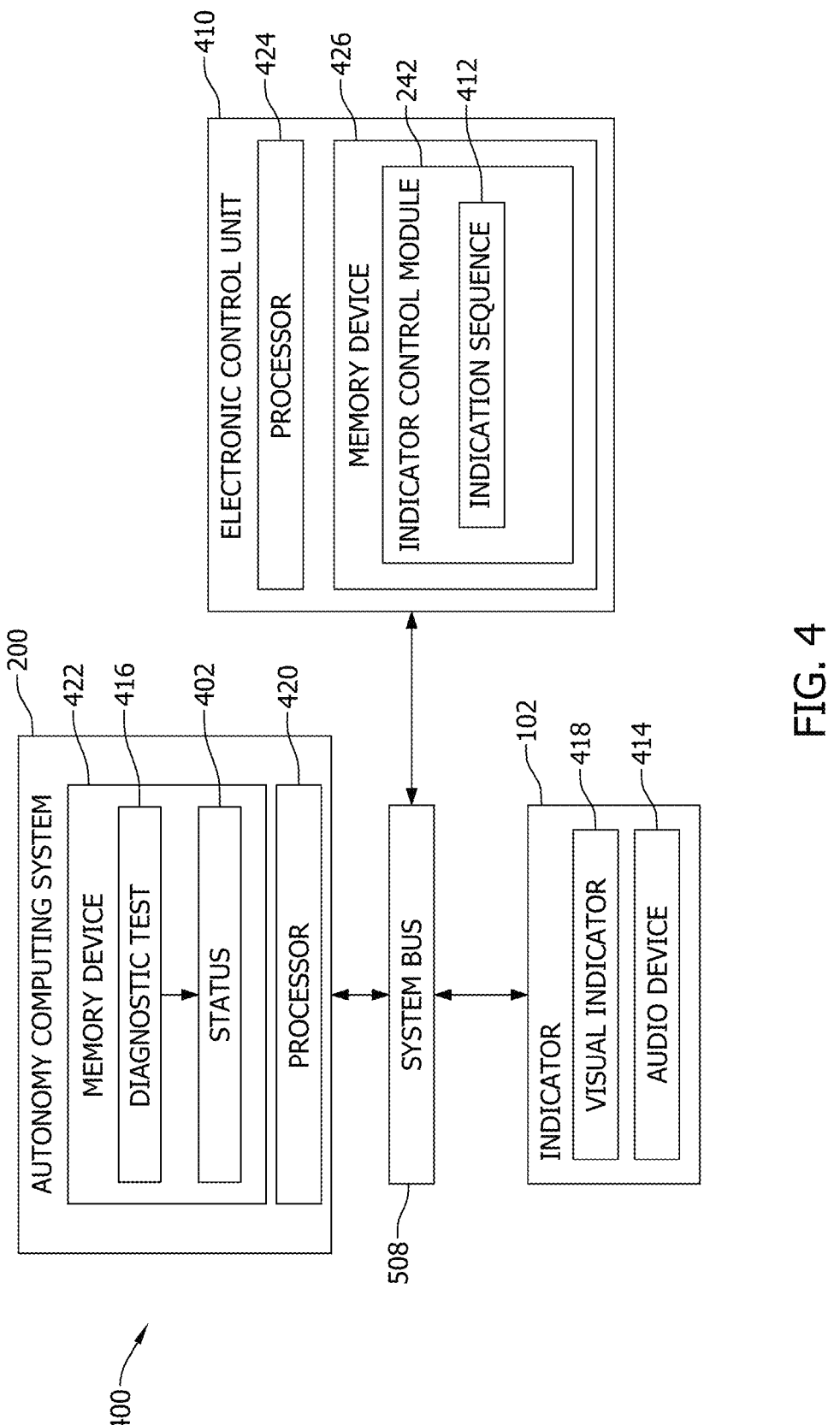
FIG. 4 is a block diagram of a system for operating indicators on an autonomous vehicle.

FIG. 4 is a system diagram of a system 400 for operating indicators on an autonomous vehicle, such as autonomous vehicle 100 shown in FIGS. 1 and 2. System 400 includes an autonomy computing system, such as an embodiment autonomy computing system 200 shown in FIG. 2. Autonomy computing system 200, electronic control unit 410, and indicator 102 are operatively connected to system bus, such that messages or other data are sent and received via system bus.

Autonomy computing system includes a processor 420 and a memory device 422, such as processor and memory device of FIG. 5, described below. The processor 420 and memory device 422 of autonomy computing system are operatively connected. Autonomy computing system 200 is operatively connected to system bus. The memory device 422 of the autonomy computing system stores a diagnostic test and a status. In some embodiments, memory device 422 of autonomy computing system further stores an indication sequence 412. Indicator 102 includes a visual indicator 418 or an audio device 414. Indicator 102 is operatively connected to system bus. Electronic control unit 410 includes a processor 424 and a memory device 426, such as processor and memory device of FIG. 5, described below. The processor 424 and memory device 426 of electronic control unit 410 are operatively connected. In some embodiments, the memory device 426 of electronic control unit 410 stores indicator control module 242. In other embodiments as shown in FIG. 2, indicator control module 242 is implemented on a separate device such as Autonomy computing system 200. Indicator control module 242 stores indication sequence 412. In some embodiments, the memory device 426 of electronic control unit 410 further stores indication sequence 412.

Autonomy computing system 200 is configured to determine status 402 of autonomous vehicle 100, such as by receiving one or more status messages or other status indications from one or more components of the autonomous vehicle 100 or by determining status 402 using the processor 420 of autonomy computing system 200. In one embodiment, one or more components of autonomous vehicle 100 transmit a message containing status 402 or status indications via system bus to autonomy computing system 200. Once the autonomy computing system has received status 402, autonomy computing system 200 transmits the status to electronic control unit 410 over system bus. In other embodiments, autonomy computing system 200 is configured to process status 402 using the processor 420 of autonomy computing system 200 to determine indication sequence 412 before transmitting indication sequence 412 to electronic control unit 410 via the system bus.

Status 402 includes any data relating to the state of any component(s) of the autonomous vehicle. For example, status 402 incudes diagnostic data indicating that the headlights are functioning properly, that the transmission is not functioning correctly, or that the tire pressure is hazardously low. Diagnostic data is generated from the result of a diagnostic test 416 performed on autonomous vehicle 100. Status 402 also includes an indication of one or more abnormalities associated with the vehicle. The abnormality includes one or more runtime errors associated with the vehicle, such as a failure of a system, for example, a lane-finding system or perception system. The abnormality includes a detected hazard or security issue, such as an intrusion within the cabin or cargo hold of autonomous vehicle 100. For example, a law enforcement officer may signal the autonomous vehicle 100 to pull over. In some embodiments, status includes an indication that a third party has made a request of autonomous vehicle 100. For example, a passerby may signal the vehicle to request medical supplies or other assistance, or a sign may request the vehicle to make a detour.

System bus includes any data bus or data transfer system capable of transmitting data between the various components of the autonomous vehicle 100 and autonomy computing system 200. In some embodiments, system bus may be a Controller Area Network (CAN bus). The CAN bus may be configured to handle transmitting status 402 data or other data, messages, or instructions between components of the autonomous vehicle 100.

Indicator 102 includes any signals, audio devices, lights, or other components which produce noise, light, or other emissions perceivable by humans or other electronics. In some embodiments, indicator 102 includes one or more visual indicators 418 associated with the autonomous vehicle. Visual indicators 418 include headlights, taillights, dashboard lights, cabin lights, marker lights, or other components capable of producing visual phenomena perceivable by humans or machines. In other embodiments, indicator 102 includes one or more audio devices 414 associated with the autonomous vehicle 100. Audio devices 414 include vehicle horns, speakers, or other components capable of producing audible phenomena perceivable by humans or machines. In some embodiments, indicator 102 includes only indicators intrinsic to the vehicle, such as existing headlights or the vehicle horn. In some embodiments, indicator 102 includes indicators retrofitted to fit the vehicle, such as by adding a strip of LED lights, additional marker lights, or a directional speaker to the autonomous vehicle 100, and ensuring these indicators are retrofitted with a connection to the autonomy computing system 200, or the electronic control unit 410.

Electronic control unit 410 includes any computing device capable of controlling one or more systems or subsystems in a motor vehicle. In the ideal embodiment, electronic control unit 410 includes a lighting control unit or an audio control unit adapted to control the functioning of one or more indicators 102 associated with autonomous vehicle 100. Electronic control unit 410 is configured to send and receive messages over system bus. For example, electronic unit 410 may receive a message containing either vehicle status 402 or an indication sequence 412 over system bus. In some embodiments, electronic control unit is configured to receive status 402 from the autonomy computing system 200, determine an indication sequence 412 based on the data, and operate at least one indicator 102 based on the indication sequence 412. In other embodiments, the electronic control unit instead is configured to receive indication sequence 412 directly from the autonomy computing system 200, and operate at least one indicator 102 based on the indication sequence 412.

Indication sequence 412 includes data, instructions, or signals. Each status 402 associated with autonomous vehicle 100 may have a unique indication sequence 412. Indication sequence 412 may achieve the number of permutations needed to cover all statuses 402 associated with a vehicle by changing one or more of at least the following: which indicator 102 is activated, the intensity, length, number of activations, time between activations, and sequence of indicators 102 activated. For example, if the status 402 of the vehicle is "brakes working", indication sequence, for example, includes flashing the headlights twice for a full second at high intensity and flashing a cabin light once for a half second. In another example, if the status 402 of the vehicle shows that the vehicle has received a request to stop and provide any medical supplies on board, the vehicle may activate lights continuously to direct the requestor to the location of the medical supplies. Indicators 102 of autonomous vehicle 100 may be operable based on indication sequence 412. In some embodiments, indication sequence 412 is machine-readable, such that when indication sequence 412 is observed by a third-party device with the appropriate software, the indication sequence 412 is deciphered by the third-party device. For example, a dashcam registers and deciphers an indication sequence 412 that indicates that autonomous vehicle 100 has encountered a navigation error.

Diagnostic test 416 includes one or more pre-trip checks or other diagnostic measures taken to identify status 402 of autonomous vehicle 100. Diagnostic test 416 is performed either manually or in an automated fashion using instructions from a third party machine or the autonomy computing system 200. Once completed, diagnostic test 416 returns a status 402, or returns an indication sequence 412 associated with the status 402.

Though the above describes an ideal embodiment in which autonomy computing system 200 is mainly responsible for processing of status 402, indication sequence 412, and transmission of data, alternative embodiments may include having the electronic control unit 410 manage these functions, as described below.

Electronic control unit 410 is a control unit for operating indicator 102 on autonomous vehicle 100. Electronic control unit 410 includes one or more elements of computing device, comprising memory storing computer executable instructions and processor 424 coupled to the memory, the processor 424, upon execution of the computer executable instructions, configured to perform one or more functions. In the ideal embodiment, processor 424 of electronic control unit 410 may be configured to receive data representing status 402 of autonomous vehicle 100, determine indication sequence 412 associated with status 402, and then operate at least one indicator 102 according to the indication sequence 412. Memory of the electronic control unit 410 may be configured to store received status 402, indication sequence 412, or other data. In some embodiments, memory of the electronic control unit stores the indicator control module 242.

In some embodiments, electronic control unit 410 is configured to operate at least one visual indicator 418 associated with autonomous vehicle 100 according to the indication sequence 412. In other embodiments, electronic control unit 410 is configured to operate at least one audio device 414 associated with the autonomous vehicle 100 according to the indication sequence 412.

In some embodiments, electronic control unit 410 is configured to be in operable communication (operatively connected) with system bus. Electronic control unit 410 is configured to receive a message, data packet, or CAN bus message representing status 402 of autonomous vehicle 100 from system bus.

In some embodiments, electronic control unit 410 is configured to be in operable communication (operatively connected) with autonomy computing system 200. Electronic control unit 410 is configured to receive a message, data packet, or CAN bus message representing status 402 of autonomous vehicle 100 from autonomy computing system 200.

In some embodiments, electronic control unit 410 is configured to receive data representing a result of diagnostic test 416 associated with the autonomous vehicle 100. In other embodiments, electronic control unit 410 is configured to receive data representing an abnormality associated with the vehicle. Electronic control unit receives data either via system bus, or from a direct operative connection with another component, such as from autonomy computing system 200.

Figure 5:
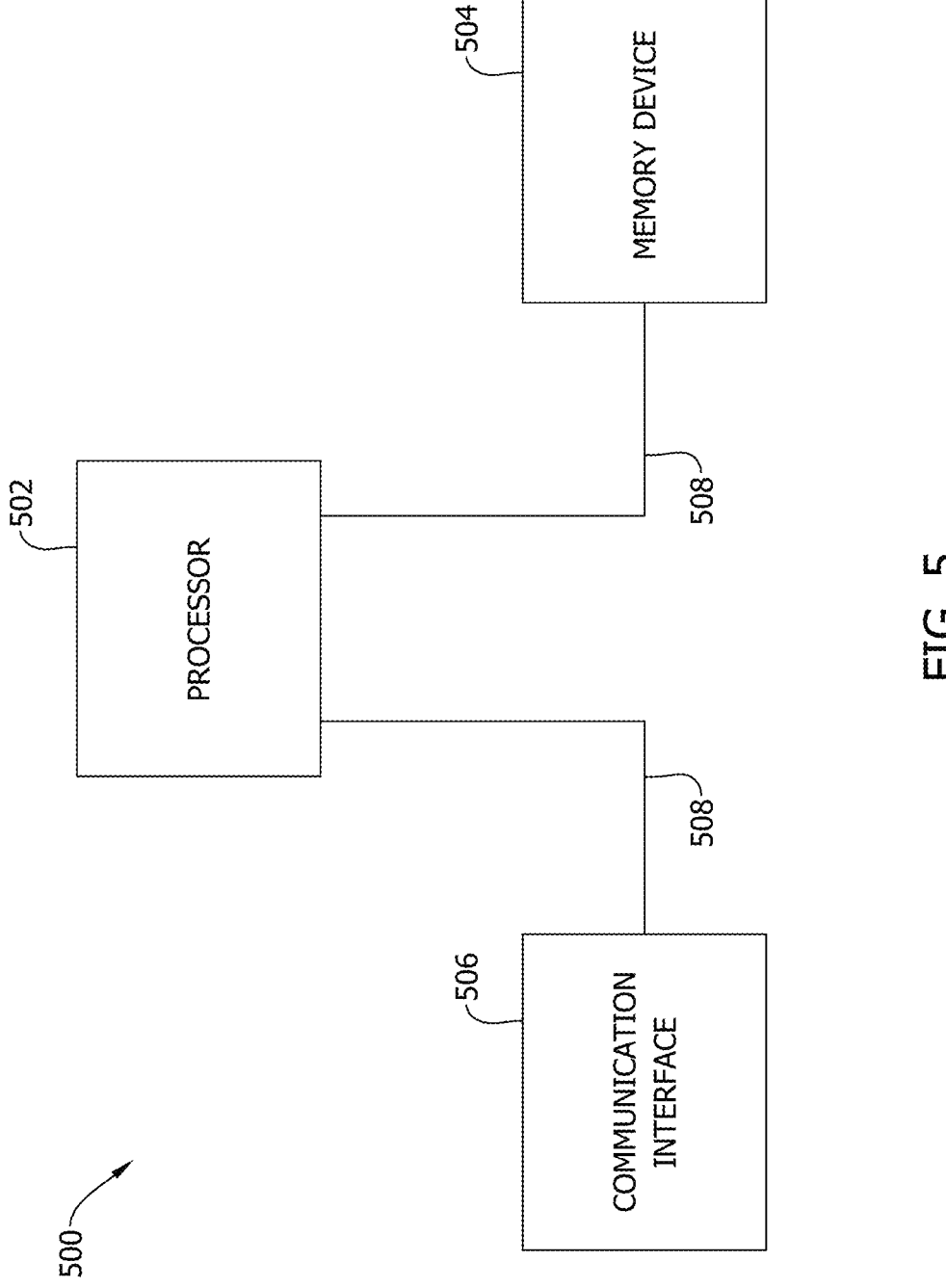
FIG. 5 is a block diagram of an example computing device.

FIG. 5 is a block diagram of an example computing device 500. Computing device 500 may embody, for example, autonomy computing system 200 shown in FIG. 2 or ECU 410 shown in FIG. 4. Computing device 500 includes a processor 502 and a memory device 504. The processor 502 is coupled to the memory device 504 via a system bus 508. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 504 includes one or more devices that enable information, such as executable instructions or other data (e.g., sensor data), to be stored and retrieved. Moreover, the memory device 504 includes one or more computer readable media, such as, without limitation, dynamic random access memory (DRAM), static random access memory (SRAM), a solid state disk, or a hard disk. In the example embodiment, the memory device 504 stores, without limitation, application source code, application object code, configuration data, additional input events, application states, assertion statements, validation results, or any other type of data. The computing device 500, in the example embodiment, may also include a communication interface 506 that is coupled to the processor 502 via system bus 508. Moreover, the communication interface 506 is communicatively coupled to data acquisition devices.

In the example embodiment, processor 502 may be programmed by encoding an operation using one or more executable instructions and providing the executable instructions in the memory device 504. In the example embodiment, the processor 502 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) providing a perceivable indication of vehicle status to observers of an autonomous vehicle, (b) reducing the overhead needed to perform adequate pre-trip checks on autonomous vehicles, (c) reducing ambiguity of autonomous vehicle status for observers, and (d) distilling diagnostic states for autonomous vehicles to a first order error report that is immediately visible.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of indicating a status of an autonomous vehicle, the method comprising:
   determining the status of the autonomous vehicle;
   transmitting the status to an electronic control unit;
   initiating the transmitting in response to detecting at least one abnormality associated with the autonomous vehicle, the at least one abnormality including physical intrusion of the autonomous vehicle;
   determining, by the electronic control unit, an indication sequence based on the status of the autonomous vehicle; and
   activating, by the electronic control unit, at least one indicator on the autonomous vehicle according to the indication sequence, an output indication sequence from the at least one indicator being machine-readable.

2. The method of claim 1, wherein activating the at least one indicator comprises activating one or more visual indicators on the autonomous vehicle.

3. The method of claim 2, wherein activating the one or more visual indicators comprises activating at least one of: a headlight, a marker light, a taillight, a brake light, a license plate light, an internal cabin light, a dashboard light, or a combination thereof.

4. The method of claim 1, wherein activating the at least one indicator comprises activating one or more audio devices.

5. The method of claim 1, wherein the autonomous vehicle includes the electronic control unit.

6. The method of claim 1, further comprising initiating the transmitting in response to determining a result of a vehicle diagnostic.

7. The method of claim 1, wherein the transmitting comprises transmitting the status to the electronic control unit over a CAN bus.

8. A system for operating indicators on an autonomous vehicle comprising:

an autonomy computing system configured to:

determine a status of the autonomous vehicle;

determine an indication sequence based on the status data and transmit the indication sequence onto a bus;

an electronic control unit coupled to the autonomy computing system via the bus and configured to:

receive the indication sequence from the autonomy computing system; and operate at least one indicator based on the indication sequence, an output indication sequence from the autonomy computing system being machine-readable.

9. The system of claim 8, further comprising at least one visual indicator operable based on the indication sequence.

10. The system of claim 8, further comprising at least one audio device operable based on the indication sequence.

11. The system of claim 8, wherein the status includes data representing at least one abnormality associated with the autonomous vehicle, the at least one abnormality including physical intrusion of the autonomous vehicle.

12. The system of claim 8, wherein the status includes data representing a result of a diagnostic test associated with the autonomous vehicle.

13. The system of claim 8, further comprising a CAN bus coupling the autonomy computing system and the electronic control unit.

14. The system of claim 8, wherein the status includes data representing a response to a request for information associated with the autonomous vehicle.

15. An electronic control unit for operating an indicator on an autonomous vehicle, the electronic control unit comprising a memory storing computer executable instructions and a processor coupled to the memory, the processor, upon execution of the computer executable instructions, configured to:

receive data representing a status of the autonomous vehicle, wherein the data includes data representing at least one abnormality associated with the autonomous vehicle, the at least one abnormality including physical intrusion of the autonomous vehicle;

determine an indication sequence associated with the status; and operate at least one indicator on the autonomous vehicle according to the indication sequence.

16. The electronic control unit of claim 15, further comprising:

wherein the processor is configured to operate at least one visual indicator on the autonomous vehicle according to the indication sequence.

17. The electronic control unit of claim 15, further comprising:

wherein the processor is configured to operate at least one audio device on the autonomous vehicle according to the indication sequence.

18. The electronic control unit of claim 15, further comprising:

wherein the processor configured to receive a CAN bus message representing the status of the autonomous vehicle.

19. The electronic control unit of claim 15, further comprising:

wherein the processor is configured to receive data representing a result of a diagnostic test associated with the autonomous vehicle.

20. The electronic control unit of claim 15, wherein an output indication sequence from the at least one indicator is machine-readable.

\* \* \* \* \*